(12) United States Patent
Wu et al.

(10) Patent No.: US 10,514,127 B2
(45) Date of Patent: Dec. 24, 2019

(54) SUSPENSION MOUNT

(71) Applicant: Wistron NeWeb Corp., Hsinchu (TW)

(72) Inventors: Yu-Shuo Wu, Hsinchu (TW); Chun-Yu Lee, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 16/137,573

(22) Filed: Sep. 21, 2018

(65) Prior Publication Data

US 2019/0203881 A1   Jul. 4, 2019

(30) Foreign Application Priority Data

Jan. 2, 2018 (TW) .............................. 107100050 A (51) Int. Cl.
*E04B 9/00* (2006.01)
*F16M 13/02* (2006.01)

(52) U.S. Cl.
CPC ........... *F16M 13/027* (2013.01); *E04B 9/006* (2013.01)

(58) Field of Classification Search
CPC ............................. F16M 13/027; E04B 9/006
See application file for complete search history.

(56) References Cited

U.S. PATENT DOCUMENTS

| | | | | |
|---|---|---|---|---|
| 6,360,507 B1 * | 3/2002 | Nevers | ..................... | E04B 9/006 248/300 |
| 8,453,988 B2 * | 6/2013 | Simpson | ................. | E04B 9/006 248/228.3 |
| 9,955,597 B1 * | 4/2018 | Wu | ......................... | F16M 13/02 |
| 10,161,565 B2 * | 12/2018 | Wu | ............................ | F16F 1/12 |
| 2006/0274522 A1 * | 12/2006 | Williams | ................ | E04B 9/006 362/217.16 |
| 2014/0117186 A1 * | 5/2014 | Govindasamy | ........ | F16M 11/16 248/317 |
| 2016/0003412 A1 * | 1/2016 | DeRose | ................. | H04R 1/026 211/117 |
| 2018/0116059 A1 * | 4/2018 | Wu | ........................ | F16M 13/02 |

FOREIGN PATENT DOCUMENTS

| | | |
|---|---|---|
| CN | 203517243 A | 4/2014 |
| TW | M541651 U | 5/2017 |
| TW | M1541651 U | 5/2017 |

* cited by examiner

*Primary Examiner* — Bradley Duckworth
(74) *Attorney, Agent, or Firm* — McClure, Qualey & Rodack, LLP (57) ABSTRACT

A suspension mount is provided, which is adapted to selectively suspend an electronic device on at least one first ceiling structure or at least one second ceiling structure. The suspension mount includes a mount body, a first clip member and a second clip member. The mount body includes a first body connection unit and a second body connection unit, wherein the first body connection unit is located on one side of the mount body, and the second body connection unit is located on another side of the mount body. The first clip member includes a plurality of first member connection portions, a plurality of second member connection portions and a first abutting portion abutting the ceiling structures. The second clip member includes a plurality of third member connection portions, a plurality of fourth member connection portions and a second abutting portion abutting the ceiling structures.

15 Claims, 12 Drawing Sheets

SUSPENSION MOUNT

CROSS REFERENCE TO RELATED APPLICATIONS

This application claims priority of Taiwan Patent Application No. 107100050, filed on Jan. 2, 2018, the entirety of which is incorporated by reference herein.

BACKGROUND OF THE INVENTION

Field of the Invention

The present invention relates to a suspension mount, and in particular to a suspension mount that can be mounted to different ceiling structures.

Description of the Related Art

Wireless routers and other electronic devices are often hung on ceilings using suspension mounts. Conventionally, a suspension mount is connected to the metal supporters of a ceiling (a.k.a. T-bar ceilings). The metal supporters (T-bars) can be T-shaped beams or in other shapes. However, since there are many different kinds of metal supporters, one single conventional suspension mount cannot be used on every metal supporter. Therefore, the electronic devices (for example, a wireless router) encounter problems during installation.

BRIEF SUMMARY OF THE INVENTION

In one embodiment of the invention, a suspension mount is provided. The suspension mount is adapted to selectively suspend an electronic device on at least one first ceiling structure or at least one second ceiling structure. The suspension mount includes a mount body, a first clip member and a second clip member. The mount body includes a first body connection unit and a second body connection unit, wherein the first body connection unit is located on a side of the mount body, and the second body connection unit is located on the other side opposite to the side of the mount body. The first clip member includes a plurality of first member connection portions, a plurality of second member connection portions and a first abutting portion, wherein the first abutting portion is capable of abutting the ceiling structures. The second clip member includes a plurality of third member connection portions, a plurality of fourth member connection portions and a second abutting portion, wherein the second abutting portion is capable of abutting the ceiling structures. When the first member connection portions are connected to the first body connection unit, and the third member connection portions are connected to the second body connection unit, a first height is defined between the first abutting portion and the mount body, and also between the second abutting portion and the mount body, and the suspension mount is adapted to be suspended on the first ceiling structure. When the second member connection portions are connected to the first body connection unit, and the fourth member connection portions are connected to the second body connection unit, a second height is defined between the first abutting portion and the mount body, and also between the second abutting portion and the mount body, and the suspension mount is adapted to be suspended on the second ceiling structure. The first height differs from the second height.

Utilizing the suspension mount of the embodiment of the invention, the mount body can selectively connect to different parts of the first clip member and the second clip member. The height of the first abutting portion relative to the mount body and the height of the second abutting portion relative to the mount body are therefore can be modified. The suspension mount can clip the ceiling structures with the same width but different thicknesses.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
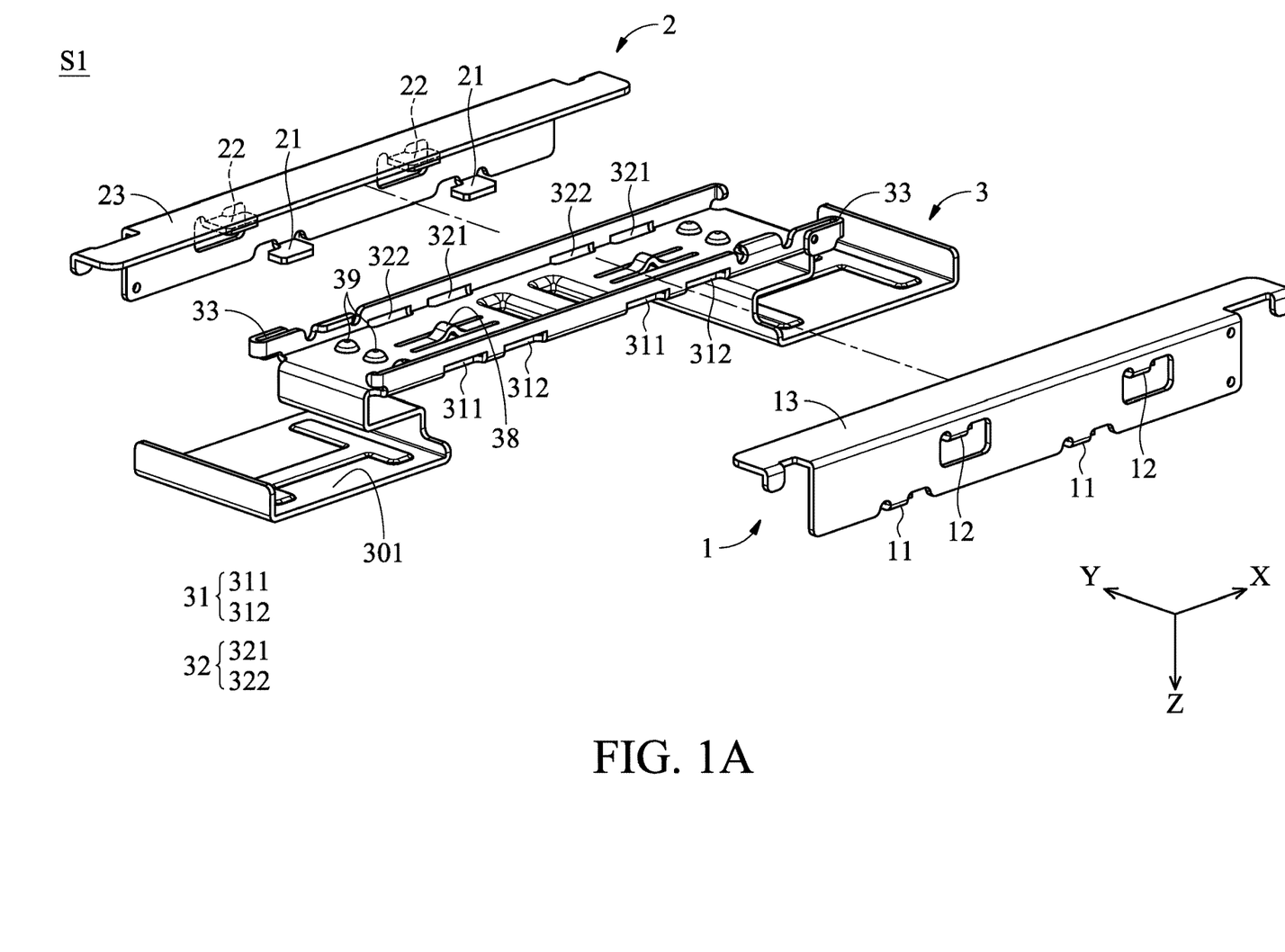
FIG. 1A is an exploded view of the suspension mount of a first embodiment of the invention.
Figure 1B:
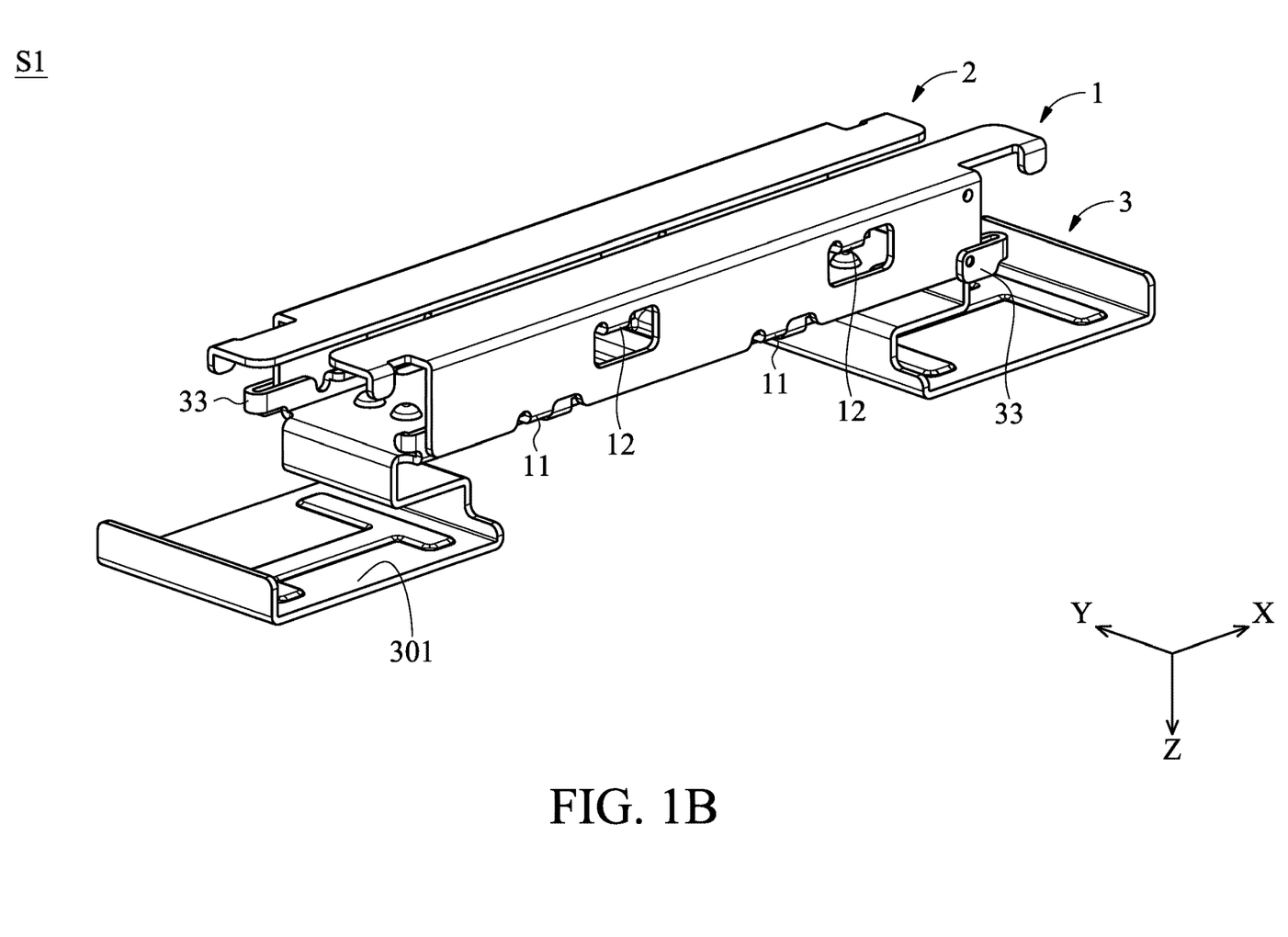
FIG. 1B is an assembly view of the suspension mount of the first embodiment of the invention.

FIG. 1A is an exploded view of the suspension mount of a first embodiment of the invention. FIG. 1B is an assembly view of the suspension mount of the first embodiment of the invention. With reference to FIGS. 1A and 1B, the suspension mount S1 of the first embodiment of the invention is adapted to selectively suspend an electronic device on at least one first ceiling structure C1 (FIG. 2A) or at least one second ceiling structure C2 (FIG. 2B). In one embodiment, the electronic device can be a wireless router, a projector or other electronic devices. The suspension mount S1 includes a mount body 3, a first clip member 1 and a second clip member 2. The mount body 3 includes a first body connection unit 31 and a second body connection unit 32. The first body connection unit 31 is located on a side of the mount body 3, and the second body connection unit 32 is located on the other side of the mount body 3. The first clip member 1 includes a plurality of first member connection portions 11, a plurality of second member connection portions 12 and a first abutting portion 13. The first abutting portion 13 abuts the ceiling structures (C1 or C2, selectively). The second clip member 2 includes a plurality of third member connection portions 21, a plurality of fourth member connection portions 22 and a second abutting portion 23, wherein the second abutting portion 23 abuts the ceiling structures (C1 or C2, selectively).

Figure 2A:
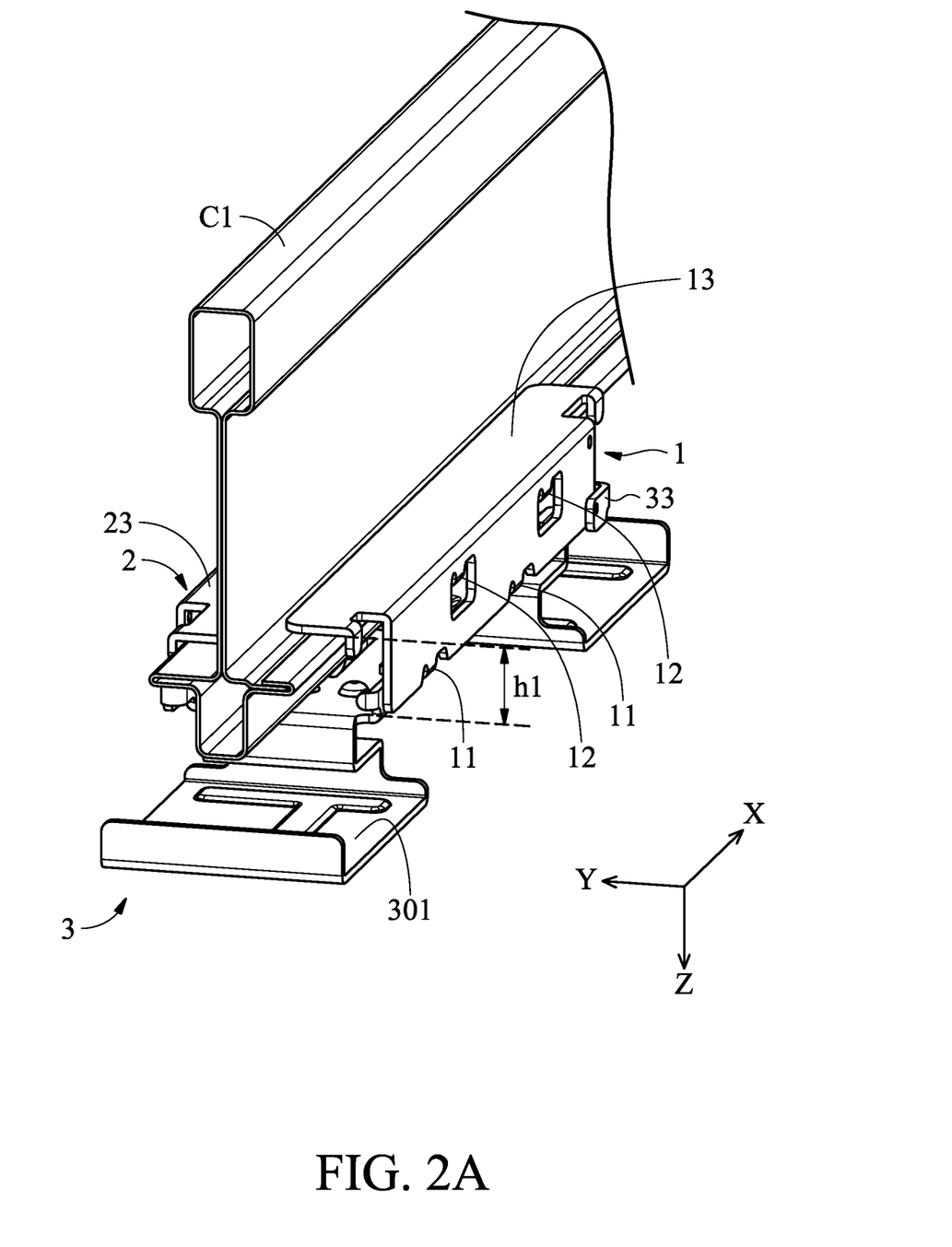
FIG. 2A shows the suspension mount of the first embodiment of the invention being suspended on a first ceiling structure.
Figure 2B:
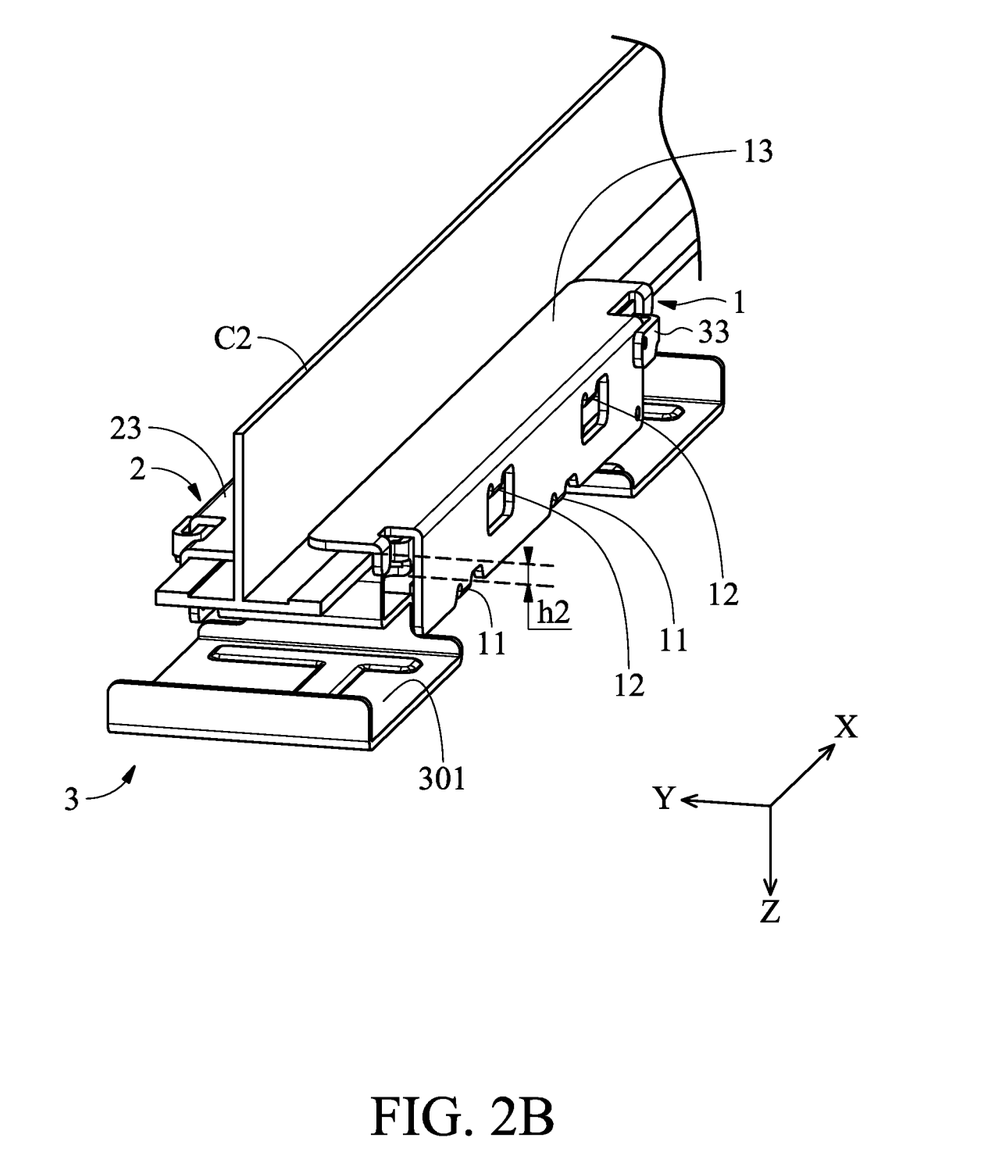
FIG. 2B shows the suspension mount of the first embodiment of the invention being suspended on a second ceiling structure.

With reference to FIGS. 1A, 1B and 2A, when the first member connection portions 11 are connected to the first body connection unit 31, and the third member connection portions 21 are connected to the second body connection unit 32, a first height h1 is defined between the first abutting portion 13 and the mount body 3, the first height h1 is also existing between the second abutting portion 23 and the mount body 3, and the suspension mount S1 is adapted to be suspended on the first ceiling structure C1.

With reference to FIGS. 1A and 2B, when the second member connection portions 12 are connected to the first body connection unit 31, and the fourth member connection portions 22 are connected to the second body connection unit 32, a second height h2 is defined between the first abutting portion 13 and the mount body 3, the second height h2 is also existing between the second abutting portion 23 and the mount body 3, and the suspension mount S1 is adapted to be suspended on the second ceiling structure C2. The first height h1 differs from the second height h2.

With reference to FIGS. 1A and 1B, in one embodiment, the first body connection unit 31 comprises a plurality of first body connection portions 311 and a plurality of second body connection portions 312. The second body connection unit 32 comprises a plurality of third body connection portions 321 and a plurality of fourth body connection portions 322. The first member connection portions 11 are adapted to be connected to the first body connection portions 311. The second member connection portions 12 are adapted to be connected to the second body connection portions 312. The third member connection portions 21 are adapted to be connected to the third body connection portions 321. The fourth member connection portions 22 are adapted to be connected to the fourth body connection portions 322.

With reference to FIGS. 1A and 1B, in this embodiment, the first body connection portions 311 and the second body connection portions 312 are aligned along a first straight line. The third body connection portions 321 and the fourth body connection portions 322 are aligned along a second straight line. Both the first straight line and the second straight line are parallel to a first direction X. In this embodiment, the first body connection portions 311, the second body connection portions 312, the third body connection portions 321, and the fourth body connection portions 322 are slots. The first member connection portions 11, the second member connection portions 12, the third member connection portions 21 and the fourth member connection portions 22 are hooks. The hooks are adapted to slide into the slots in a direction parallel to the first direction X.

With reference to FIGS. 1A and 1B, in one embodiment, the mount body 3 further comprises two stoppers 33. The stoppers 33 are formed on the mount body 3 diagonally. The stoppers 33 respectively receives the first clip member 1 and the second clip member 2 to restrict the movement of the first clip member 1 and the second clip member 2 along the first direction X.

With reference to FIGS. 1A and 1B, in one embodiment, the second member connection portions 12 is located between the first member connection portions 11 and the first abutting portion 13 along the second direction Z. The second member connection portions 12 and the first member connection portions 11 are staggered along the first direction X, and the first direction X is perpendicular to the second direction Z. The hooks (for example, the first member connection portions 11 and the second member connection portions 12) protrude in a third direction Y, and the third direction Y is perpendicular to the first direction Z and the second direction Z.

With reference to FIGS. 1A, 1B, 2A and 2B, in one embodiment, the mount body 3 comprises at least one elastic structure 38. When the first ceiling structure C1 or the second ceiling structure C2 is connected to the suspension mount S1, the elastic structure 38 abuts the first ceiling structure C1 or the second ceiling structure C2. The first ceiling structure C1 or the second ceiling structure C2 is therefore sandwiched between the elastic structure 38 and the first abutting portion 13, and between the elastic structure 38 and the second abutting portion 23. Therefore, the suspension mount S1 can sufficiently hold the first ceiling structure C1 or the second ceiling structure C2.

With reference to FIGS. 1A, 1B, 2A and 2B, in one embodiment, the mount body 3 comprises at least one protrusion 39. When the first ceiling structure C1 or the second ceiling structure C2 are connected to the suspension mount S1, the protrusions 39 abut the first ceiling structure C1 or the second ceiling structure C2, and the first ceiling structure C1 or the second ceiling structure C2 is sandwiched between the protrusions 39 and the first abutting portion 13, and between the protrusions 39 and the second abutting portion 23. Therefore, the suspension mount S1 can sufficiently hold the first ceiling structure C1 or the second ceiling structure C2.

With reference to FIGS. 1A, 1B, 2A and 2B, in one embodiment, the mount body 3 comprises two extending portions 301, the extending portions 301 are formed on two ends of the mount body 3, and the width of the extending portions 301 differs from the width of the first ceiling structure C1. Therefore, the suspension mount S1 can be assembled with the mounts or electronic devices having various dimensions.

Figure 3A:
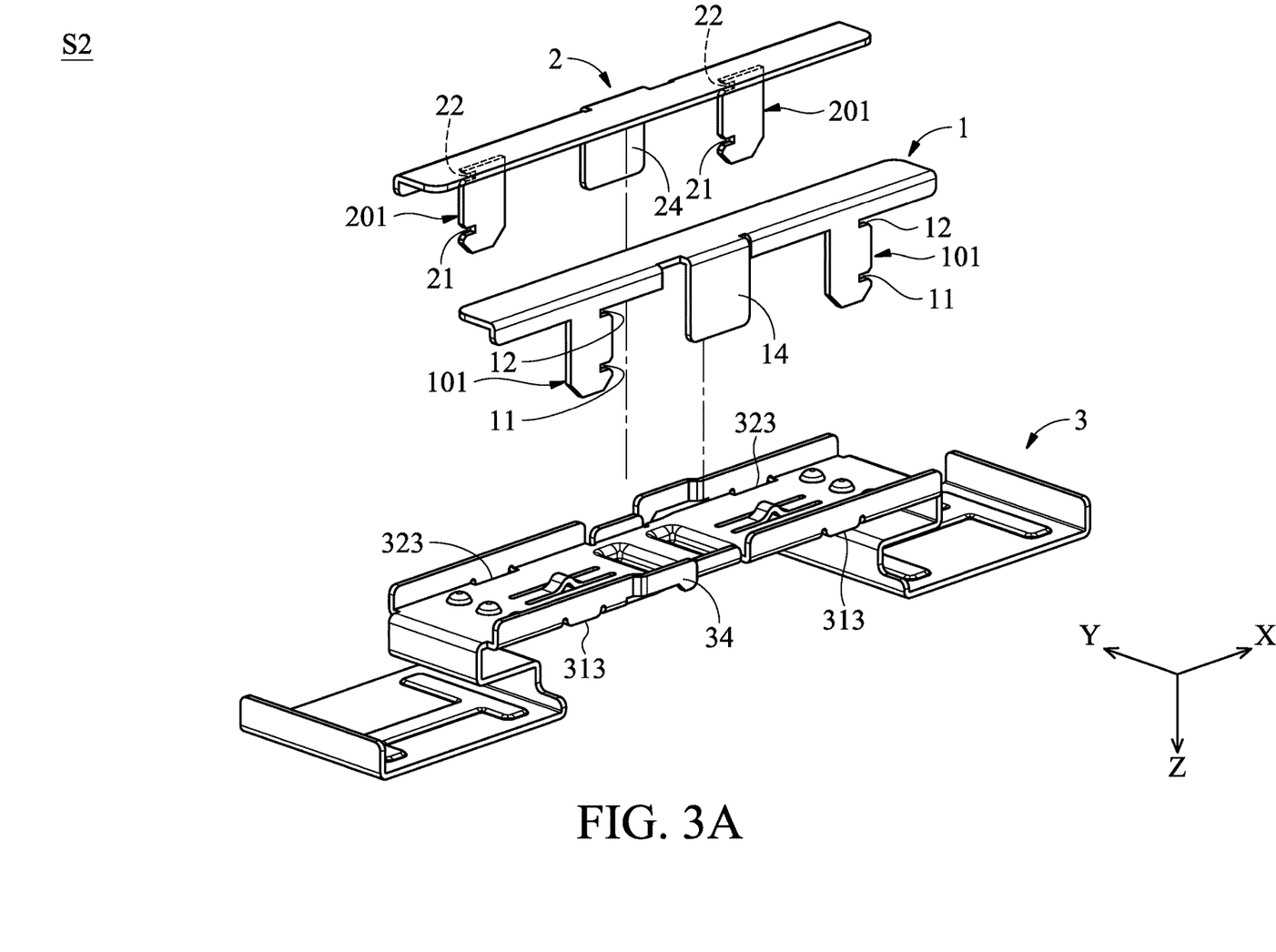
FIG. 3A is an exploded view of the suspension mount of a second embodiment of the invention.
Figure 3B:
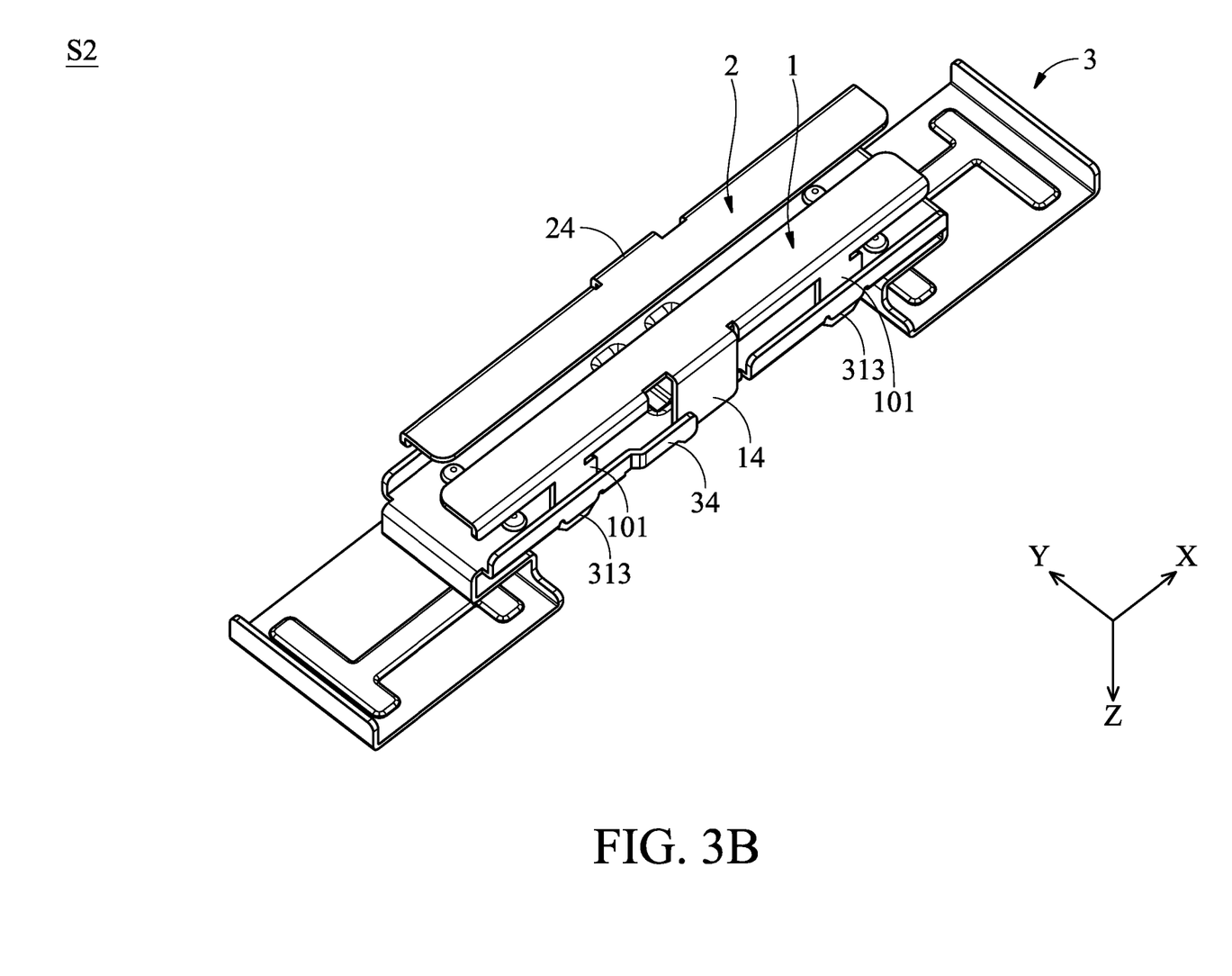
FIGS. 3B, 3C and 3D show the assembly process of the suspension mount of the second embodiment of the invention.
Figure 3C:
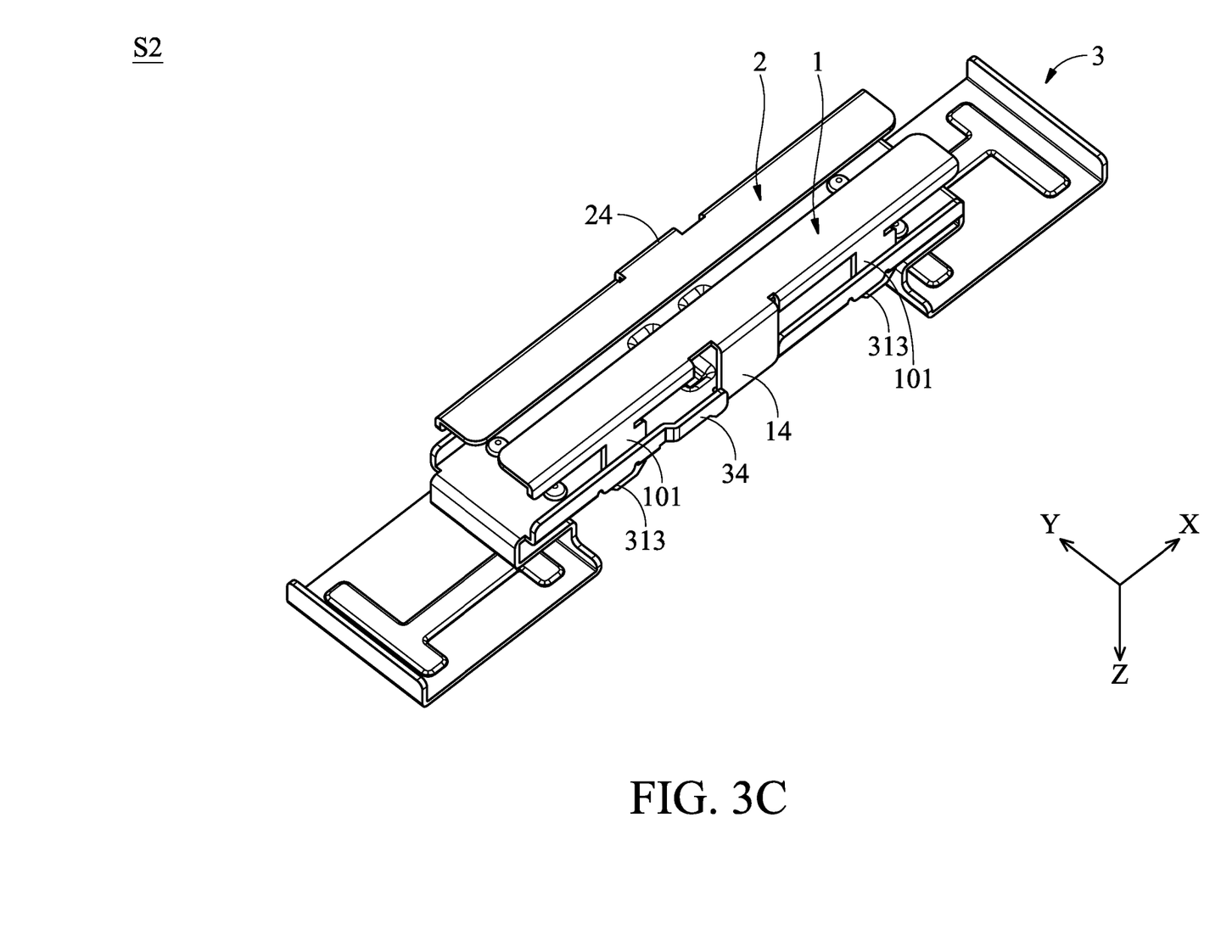
Figure 3D:
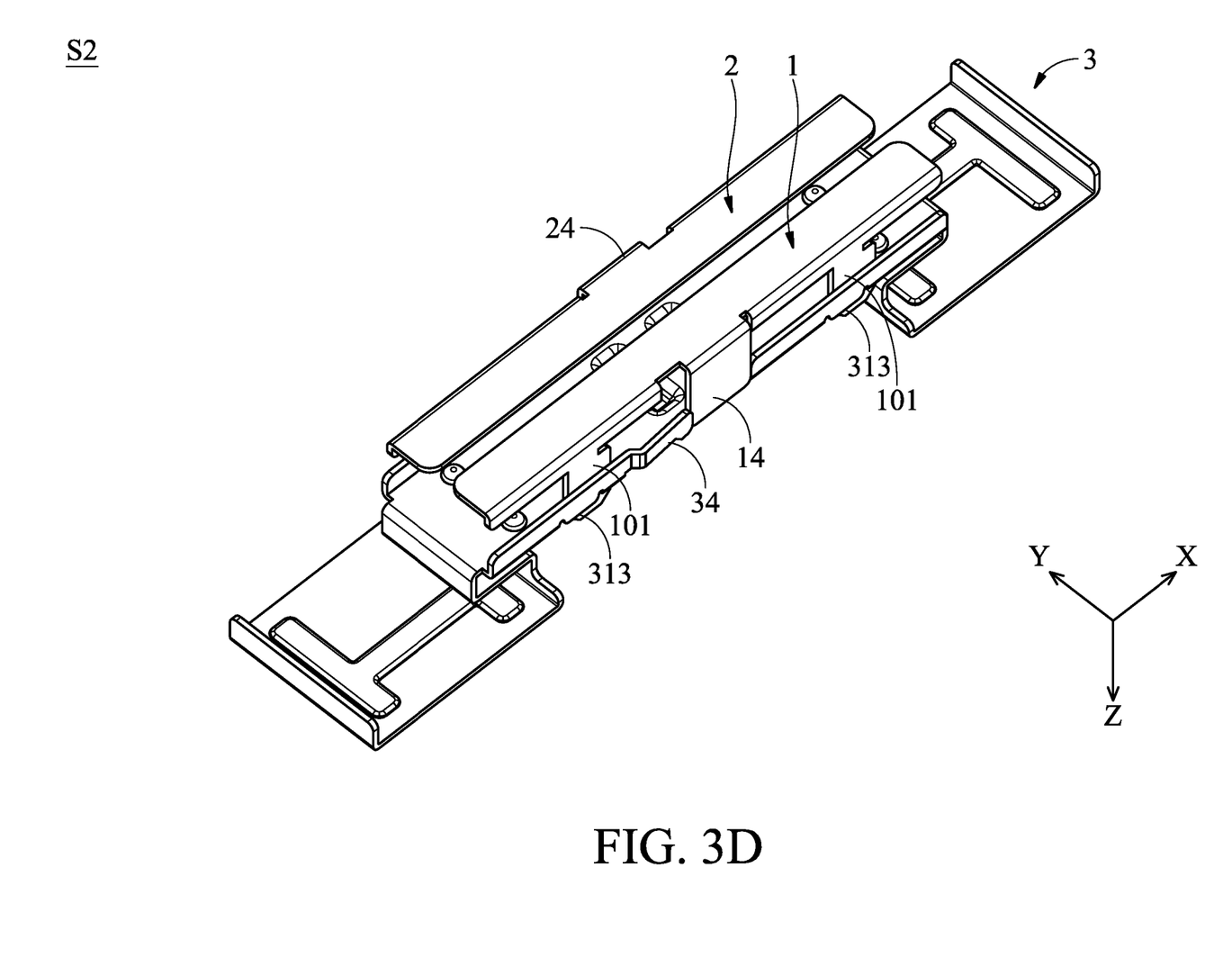

FIG. 3A is an exploded view of the suspension mount of a second embodiment of the invention. FIGS. 3B, 3C and 3D show the assembly process of the suspension mount of the second embodiment of the invention. With reference to FIGS. 3A, 3B, 3C and 3D, in the suspension mount S2 of the second embodiment of the invention, the first body connection unit comprises two first body connection slots 313. The second body connection unit comprises two second body connection slots 323. The first member connection portions 11 or the second member connection portions 12 connect the first body connection slots 313 in the first direction X. The third member connection portions 21 or the fourth member connection portions 22 connect the second body connection slots 323 in the first direction X.

With reference to FIGS. 3A, 3B, 3C and 3D, in this embodiment, the first clip member 1 comprises two first member connection units 101. Each first member connection unit 101 comprises one of the first member connection portions 11 and one of the second member connection portions 12. The second clip member 2 comprises two second member connection units 201. Each second member connection unit 201 comprises one of the third member connection portions 21 and one of the fourth member connection portions 22. The first member connection units 101 and the second member connection units 201 extend along the second axis Z. The first member connection units 101 are inserted into the first body connection slots 313 in the second direction Z, and the second member connection units 201 are inserted into the second body connection slots 323 in the second direction Z.

With reference to FIG. 3A, in this embodiment, the first clip member 1 and the second clip member 2 both have a fastener (14, 24) extending in the second direction Z. The mount body 3 further comprises a plurality of cantilever beam stoppers 34. The assembly process of the suspension mount S2 of the second embodiment of the invention is described hereafter. With reference to FIG. 3B, first, the first member connection units 101 are inserted into the first body connection slots 313 in the second direction Z, and the second member connection units 201 are inserted into the second body connection slots 323 in the second direction Z. Next, with reference to FIG. 3C, the first member connection units 101 connect with the first body connection slots 313 in the first direction X, and the second member connection units 201 connect with the second body connection slots 323 in the first direction X. Then, the cantilever beam stoppers 34 are bent and being abutted against the fasteners 14 formed on the first clip member 1 and the fasteners 24 formed on the second clip member 2 to restrict the movement of the first clip member 1 and the second clip member 2 along the first direction X.

Figure 4A:
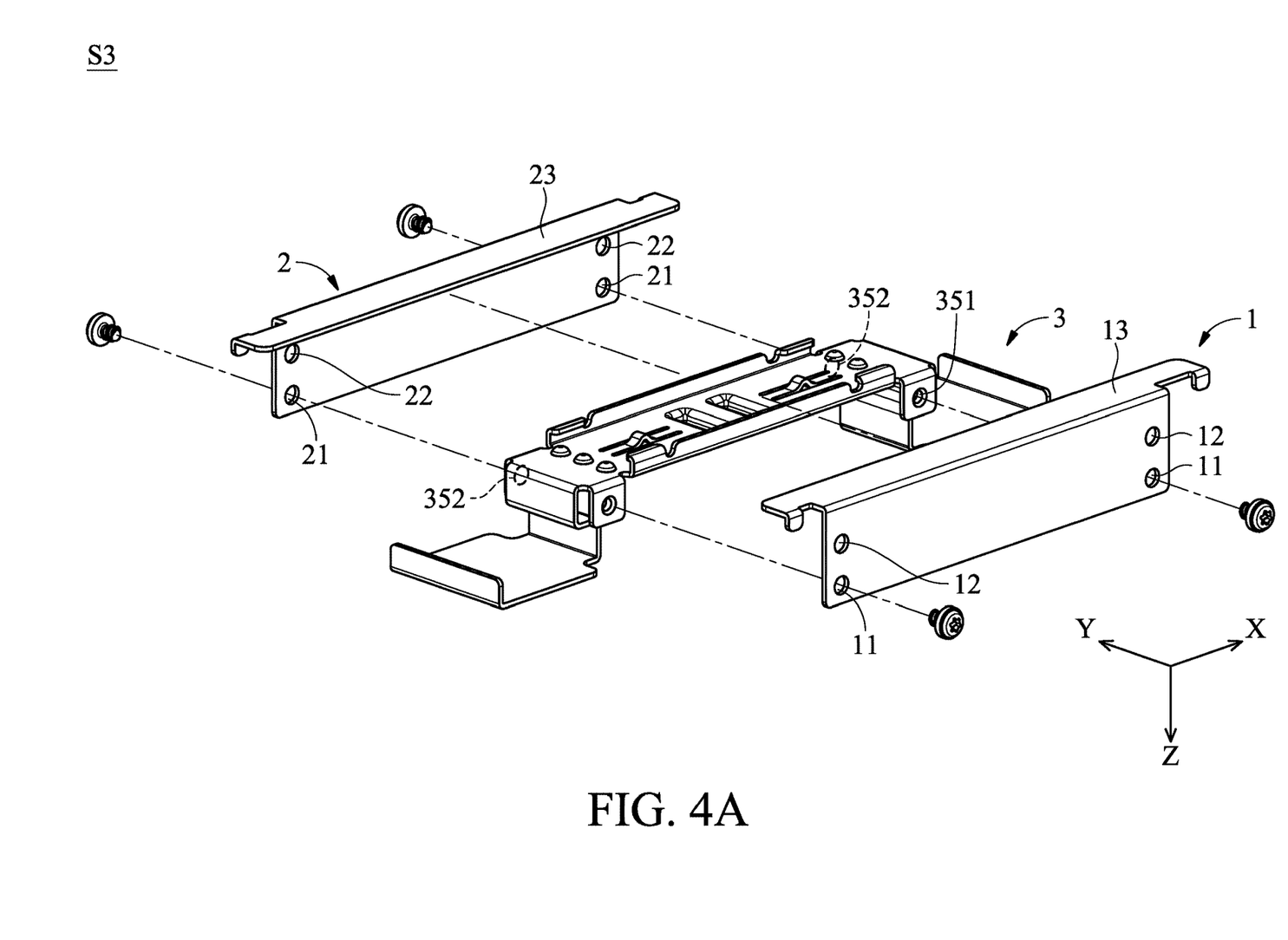
FIG. 4A is an exploded view of the suspension mount of a third embodiment of the invention.
Figure 4B:
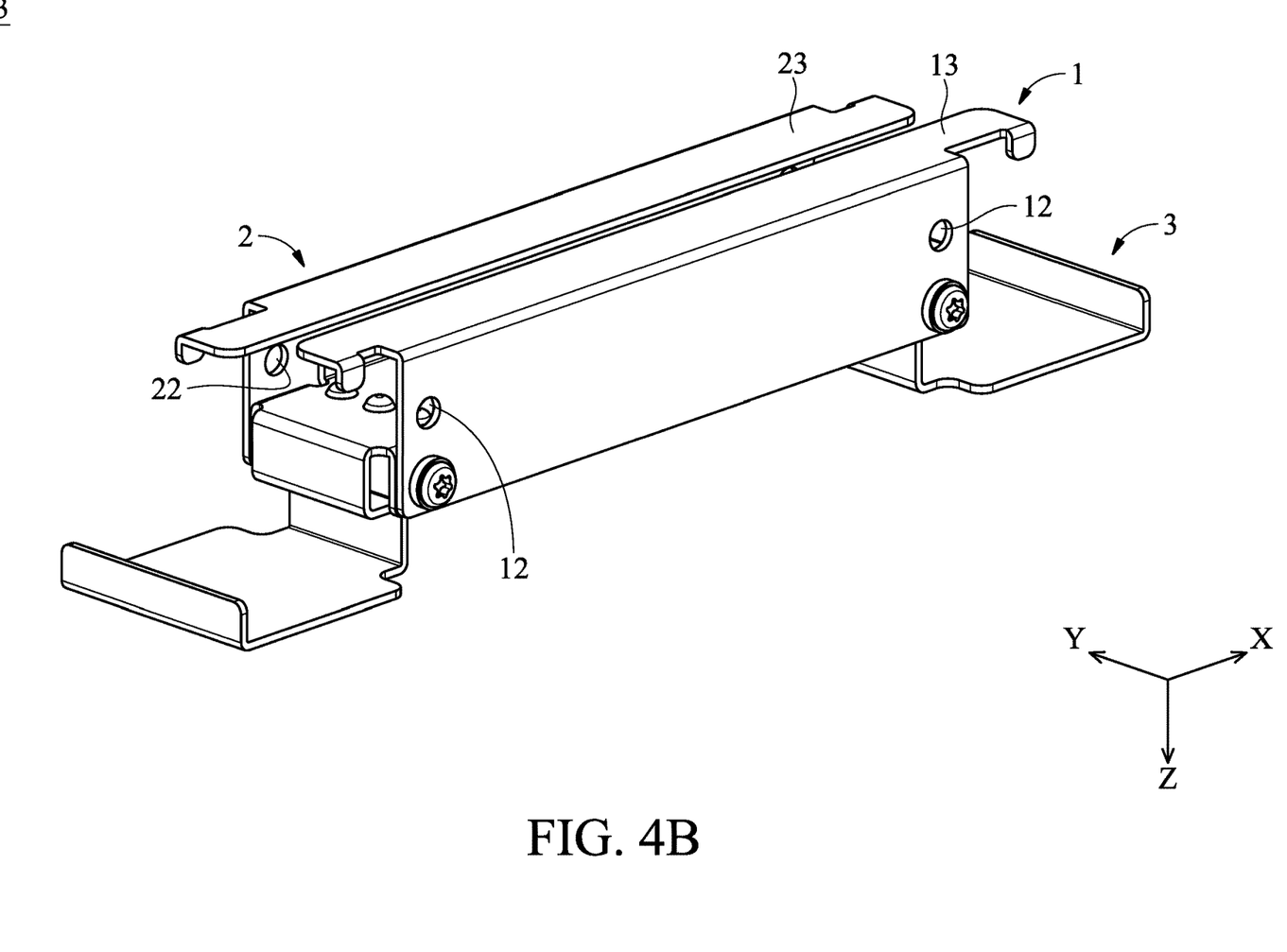
FIG. 4B is an assembly view of the suspension mount of the third embodiment of the invention

FIG. 4A is an exploded view of the suspension mount of a third embodiment of the invention. FIG. 4B is an assembly view of the suspension mount of the third embodiment of the invention. With reference to FIGS. 4A and 4B, in the suspension mount S3 of the third embodiment of the invention, the first body connection unit comprises two first body connection holes 351, and the second body connection unit comprises two second body connection holes 352. The first body connection holes 351 selectively connect to the first member connection portions 11 and the second member connection portions 12. The second body connection holes 352 selectively connect to the third member connection portions 21 and the fourth member connection portions 22. Therefore, the heights of the first abutting portion 13 and the second abutting portion 23 can be altered.

Figure 5A:
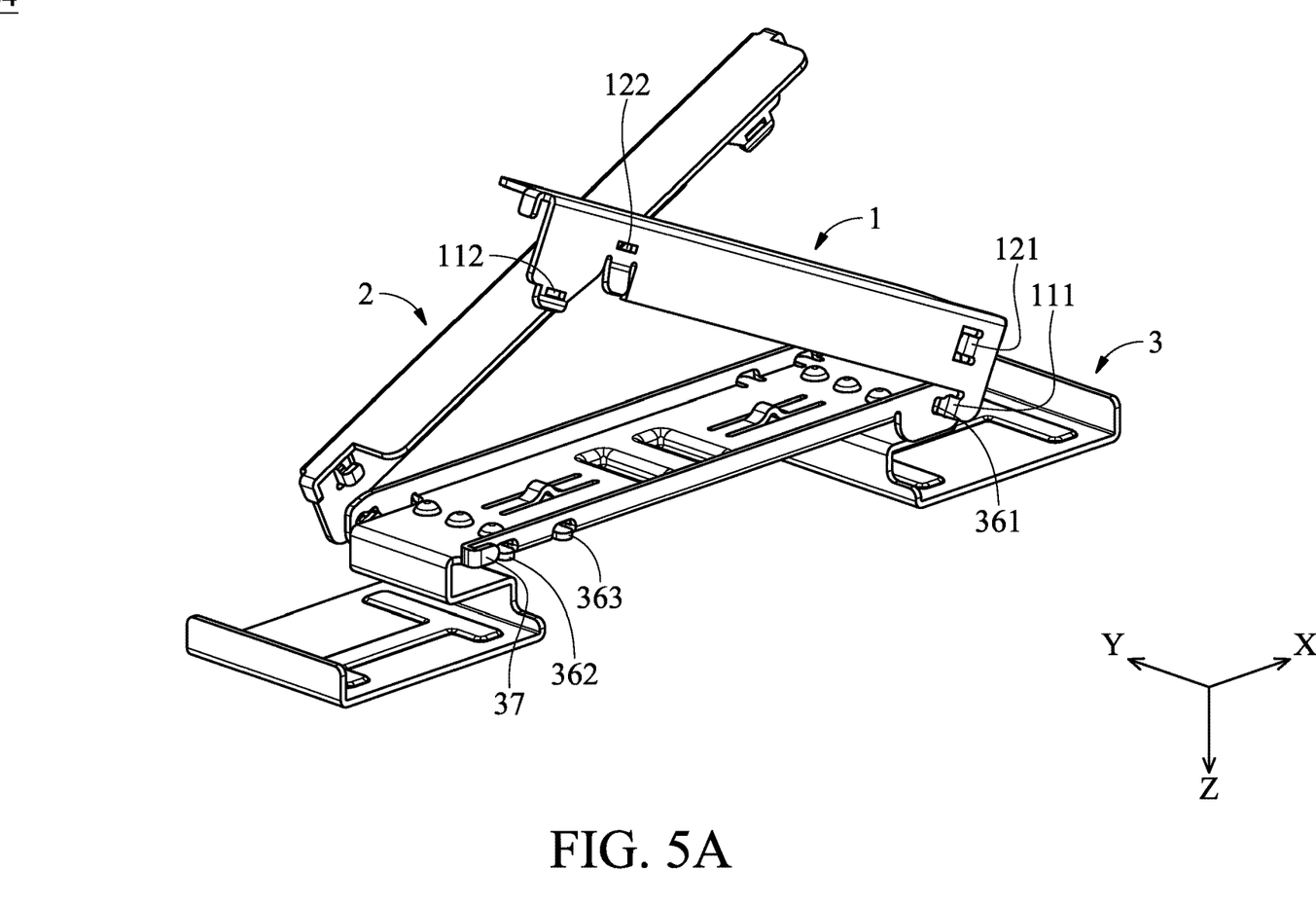
FIG. 5A is an exploded view of the suspension mount of a fourth embodiment of the invention.
Figure 5B:
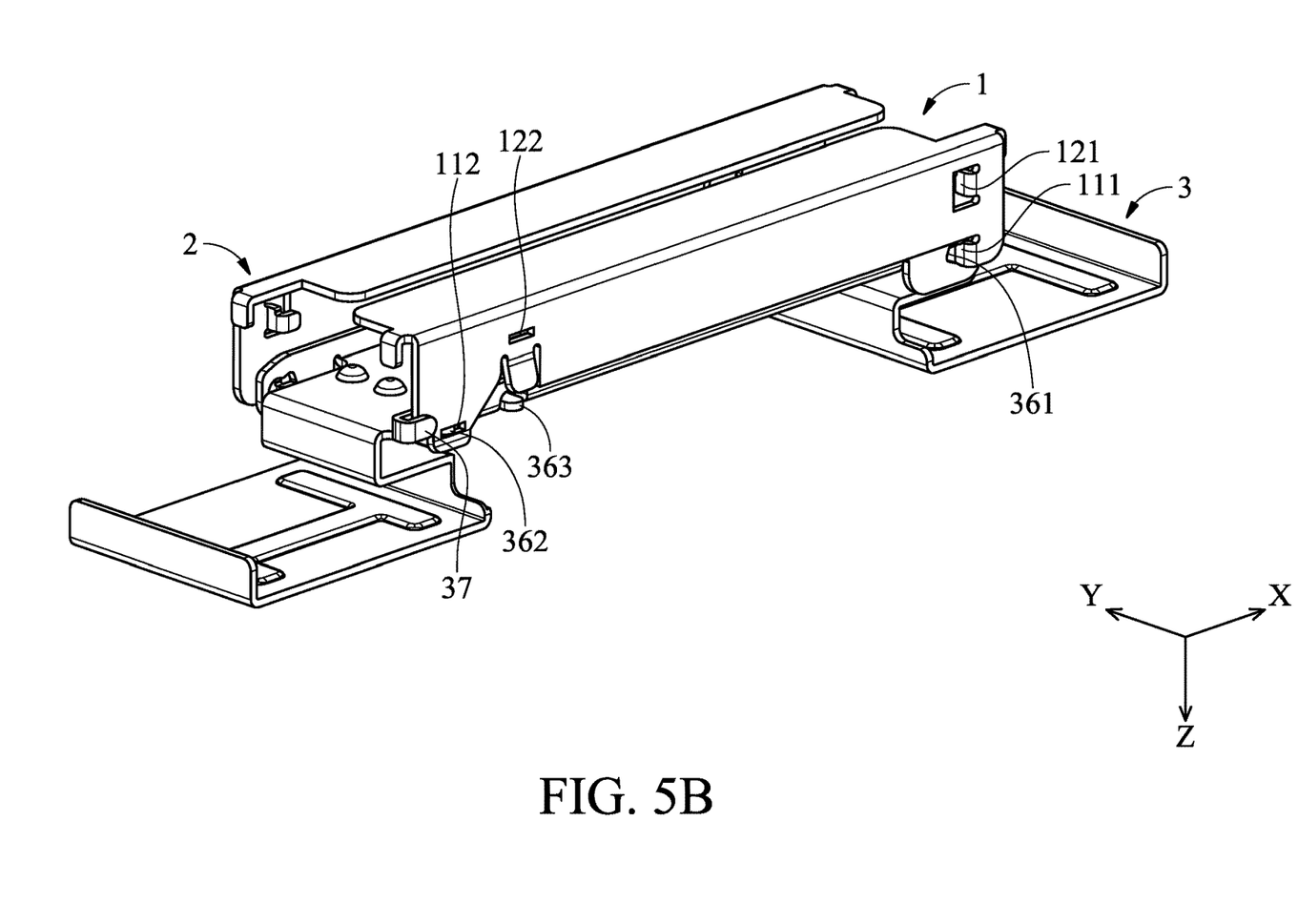
FIG. 5B is an assembly view of the suspension mount of the fourth embodiment of the invention.

FIG. 5A is an exploded view of the suspension mount of a fourth embodiment of the invention. FIG. 5B is an assembly view of the suspension mount of the fourth embodiment of the invention. With reference to FIGS. 5A and 5B, in the suspension mount S4 of the fourth embodiment of the invention, the first body connection unit comprises a first body pivot portion 361, a first body hook portion 362 and a second body hook portion 363. Each first member connection portion comprises a first member pivot portion 111 and a first member hook portion 112. Each second member connection portion comprises a second member pivot portion 121 and a second member hook portion 122. When the first member pivot portion 111 is connected to the first body pivot portion 361 and the first member hook portion 112 is connected to the first body hook portion 362, the suspension mount S4 is adapted to be connected to the first ceiling structure C1. When the second member pivot portion 121 is connected to the first body pivot portion 361 and the second member hook portion 122 is connected to the second body hook portion 363, the suspension mount S4 is adapted to be connected to the second ceiling structure C2.

With reference to FIGS. 5A and 5B, in this embodiment, the mount body 3 further comprises a plurality of restriction portions 37, the restriction portions 37 are adapted to abut the first clip member 1 and the second clip member 2 to restrict the movement of the first clip member 1 and the second clip member 2 along the first direction X.

Utilizing the suspension mount of the embodiment of the invention, the mount body can selectively connect to different parts of the first clip member and the second clip member. The height of the first abutting portion relative to the mount body and the height of the second abutting portion relative to the mount body are therefore can be altered. The suspension mount can clip the ceiling structures with the same width but different thicknesses, such as the first ceiling structure C1 of FIG. 2A and the second ceiling structure C2 of FIG. 2B.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A suspension mount, adapted to selectively suspend an electronic device on at least one first ceiling structure or at least one second ceiling structure, comprising:
   a mount body, comprising a first body connection unit and a second body connection unit, wherein the first body connection unit is located on a side of the mount body, and the second body connection unit is located on the other side of the mount body;
   a first clip member, detachably connected to the mount body, and comprising a plurality of first member connection portions, a plurality of second member connection portions, and a first abutting portion, wherein the first abutting portion is adapted to abut the ceiling structures; and
   a second clip member, detachably connected to the mount body, and comprising a plurality of third member connection portions, a plurality of fourth member connection portions and a second abutting portion, wherein the second abutting portion is adapted to abut the ceiling structures,
   wherein when the first member connection portions are connected to the first body connection unit, and the third member connection portions are connected to the second body connection unit, a first height is defined between the first abutting portion and the mount body, and also between the second abutting portion and the mount body, and the suspension mount is adapted to be suspended on the first ceiling structure,
   wherein when the second member connection portions are connected to the first body connection unit, and the fourth member connection portions are connected to the second body connection unit, a second height is defined between the first abutting portion and the mount body, and also between the second abutting portion and the mount body, and the suspension mount is adapted to be suspended on the second ceiling structure, wherein the first height differs from the second height.

2. The suspension mount as claimed in claim 1, wherein the first body connection unit comprises a plurality of first body connection portions and a plurality of second body connection portions, the second body connection unit comprises a plurality of third body connection portions and a plurality of fourth body connection portions, the first member connection portions are adapted to be connected to the first body connection portions, the second member connection portions are adapted to be connected to the second body connection portions, the third member connection portions are adapted to be connected to the third body connection portions, and the fourth member connection portions are adapted to be connected to the fourth body connection portions.

3. The suspension mount as claimed in claim 2, wherein the first body connection portions and the second body connection portions are located on a straight line, the third body connection portions and the fourth body connection portions are located on another straight line, and arranged along a first direction.

4. The suspension mount as claimed in claim 3, wherein the first body connection portions, the second body connection portions, the third body connection portions and the fourth body connection portions are slots, and the first member connection portions, the second member connection portions, the third member connection portions and the fourth member connection portions are hooks, and the hooks are adapted to slide in the slots in the first direction.

5. The suspension mount as claimed in claim 4, wherein the mount body further comprises two stoppers, the stoppers are formed on opposite angles of the mount body, the stoppers respectively wedge the first clip member and the second clip member to restrict the movement of the first clip member and the second clip member along the first direction.

6. The suspension mount as claimed in claim 4, wherein the second member connection portions are located between the first member connection portions and the first abutting portion along a second direction, the second member connection portions and the first member connection portions are staggered along the first direction, and the first direction is perpendicular to the second direction.

7. The suspension mount as claimed in claim 6, wherein the hooks protrude along a third direction, and the third direction is perpendicular to the first direction and the second direction.

8. The suspension mount as claimed in claim 1, wherein the first body connection unit comprises two first body connection slots, the second body connection unit comprises two second body connection slots, the first member connection portions or the second member connection portions connect the first body connection slots in a first direction, and the third member connection portions or the fourth member connection portions connect the second body connection slots in the first direction.

9. The suspension mount as claimed in claim 8, wherein the first clip member comprises two first member connection units, each first member connection unit comprises one of the first member connection portions and one of the second member connection portions, and the second clip member comprises two second member connection units, each second member connection unit comprises one of the third member connection portions and one of the fourth member connection portions, and the first member connection units and the second member connection units extend along a second direction, the first member connection units are inserted into the first body connection slots in the second direction, and the second member connection units are inserted into the second body connection slots in the second direction.

10. The suspension mount as claimed in claim 9, wherein the first clip member and the second clip member both have a fastener extending in the second direction, the mount body further comprises a plurality of cantilever beam stoppers, the cantilever beam stoppers abut the fasteners formed on the first clip member and the second clip member respectively to restrict the movement of the first clip member and the second clip member in the first direction.

11. The suspension mount as claimed in claim 1, wherein the first body connection unit comprises two first body connection holes, the second body connection unit comprises two second body connection holes, the first body connection holes selectively connect to the first member connection portions and the second member connection portions, and the second body connection holes selectively connect to the third member connection portions and the fourth member connection portions.

12. The suspension mount as claimed in claim 1, wherein the first body connection unit comprises a first body pivot portion, a first body hook portion and a second body hook portion, each first member connection portion comprises a first member pivot portion and a first member hook portion, each second member connection portion comprises a second member pivot portion and a second member hook portion, when the first member pivot portion is connected to the first body pivot portion and the first member hook portion is connected to the first body hook portion, the suspension mount is adapted to be connected to the first ceiling structure, and when the second member pivot portion is connected to the first body pivot portion and the second member hook portion is connected to the second body hook portion, the suspension mount is adapted to be connected to the second ceiling structure.

13. The suspension mount as claimed in claim 12, wherein the mount body further comprises a plurality of restriction portions, and the restriction portions are adapted to abut the first clip member and the second clip member to restrict the movement of the first clip member and the second clip member along a first direction.

14. The suspension mount as claimed in claim 1, wherein the mount body comprises at least one elastic structure, and when the first ceiling structure or the second ceiling structure is connected to the suspension mount, the elastic structure abuts the first ceiling structure or the second ceiling structure, and the first ceiling structure or the second ceiling structure is therefore sandwiched between the elastic structure and the first abutting portion, and between the elastic structure and the second abutting portion.

15. The suspension mount as claimed in claim 1, wherein the mount body comprises at least one protrusion, wherein when the first ceiling structure or the second ceiling structure is connected to the suspension mount, the protrusions abut the first ceiling structure or the second ceiling structure, and the first ceiling structure or the second ceiling structure is sandwiched between the protrusions and the first abutting portion, and between the protrusions the second abutting portion.

* * * * *